(No Model.) 2 Sheets—Sheet 1.
W. F. NIEBLING.
APPARATUS FOR TREATING MILK HYGIENICALLY.
No. 604,177. Patented May 17, 1898.
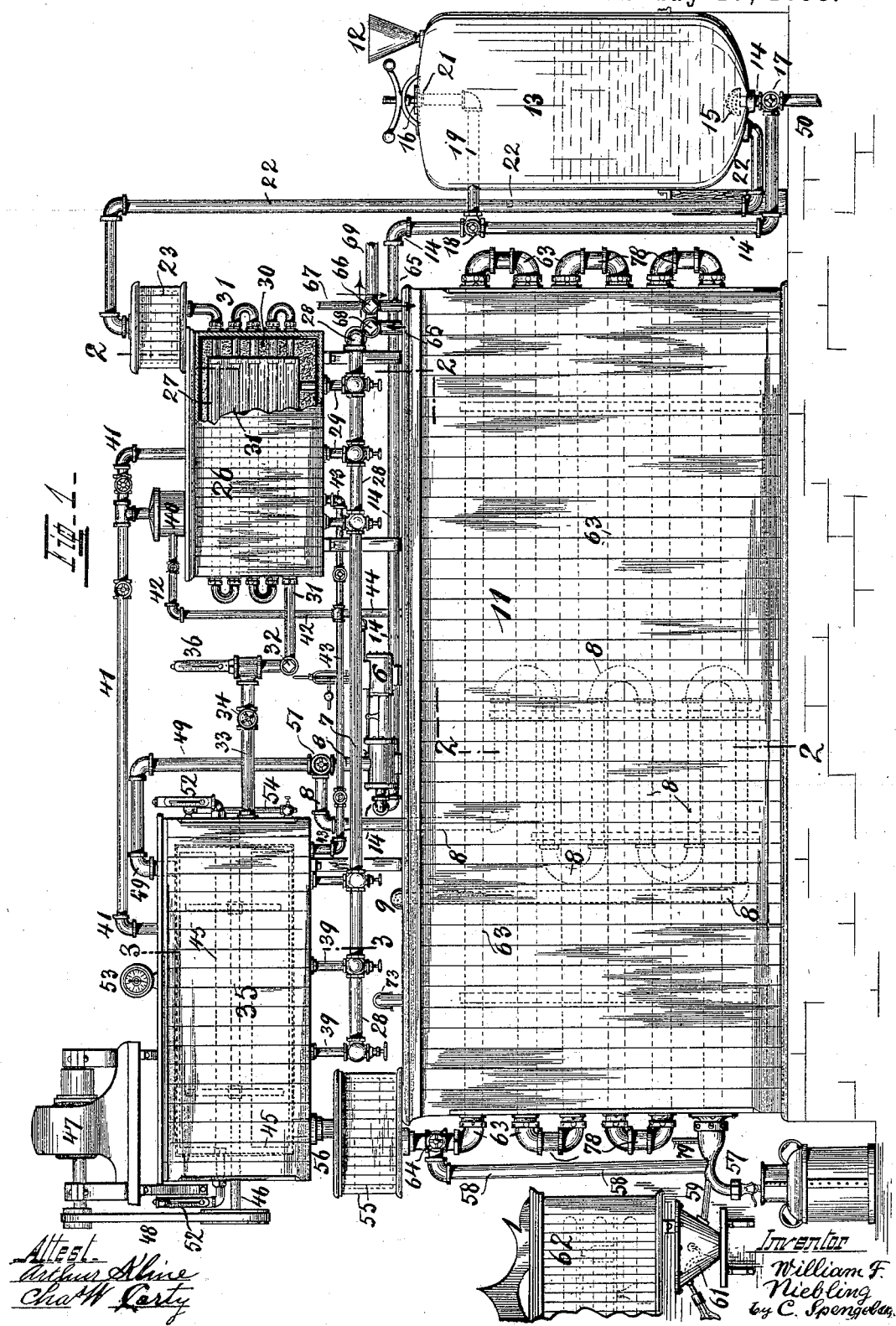
Attest:
Arthur Kline
Chas W Carty
Inventor
William F. Niebling
by C. Spengler (No Model.) 2 Sheets—Sheet 2.
W. F. NIEBLING.
APPARATUS FOR TREATING MILK HYGIENICALLY.
No. 604,177. Patented May 17, 1898.
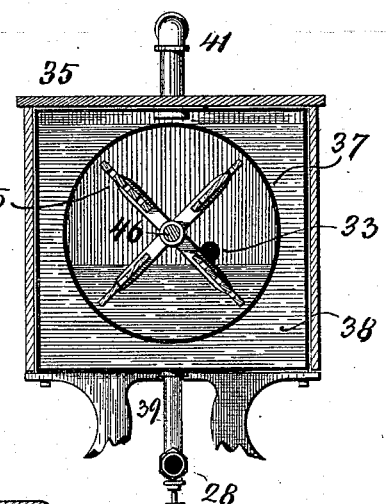
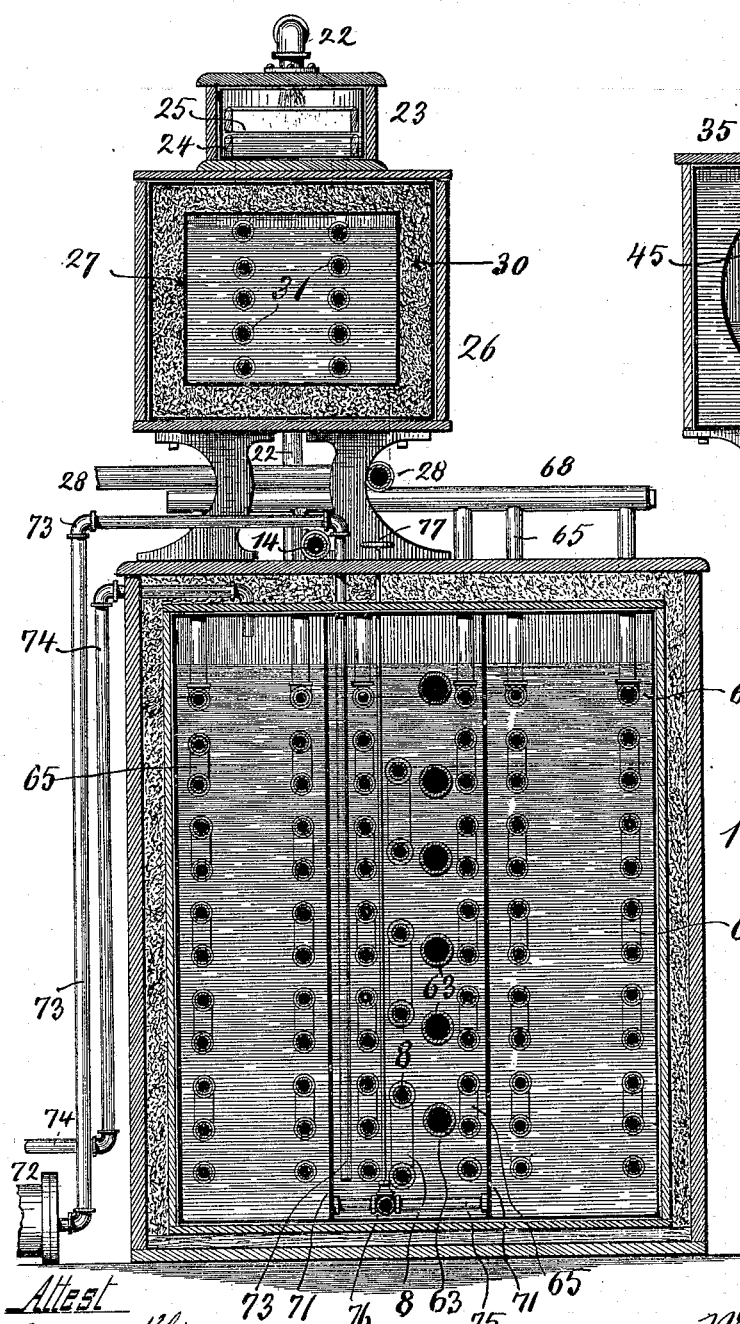

UNITED STATES PATENT OFFICE.

WILLIAM F. NIEBLING, OF CINCINNATI, OHIO.

APPARATUS FOR TREATING MILK HYGIENICALLY.

SPECIFICATION forming part of Letters Patent No. 604,177, dated May 17, 1898.

Application filed June 18, 1897. Serial No. 641,219. (No model.)

*To all whom it may concern:*

Be it known that I, WILLIAM F. NIEBLING, a citizen of the United States, and a resident of Cincinnati, Hamilton county, State of Ohio, have invented a certain new and useful Apparatus for Treating Milk Hygienically; and I do declare the following to be a clear, full, and exact description of the invention, such as will enable others skilled in the art to which it appertains to make and use the same, attention being called to the accompanying drawings, with the reference-numerals marked thereon, which form a part of this specification.

This invention relates to an apparatus for treating milk for the purpose of preparing the same according to hygienic requirements either for conservation or for immediate consumption. The treatment consists, substantially, of cooling and aerating the milk, straining the same, sterilizing it, and then cooling it again.

The invention consists of the apparatus necessary for carrying this treatment out.

In the following specification, and particularly pointed out in the claims, is found a full description of the invention, its operation, parts, and construction, which latter is also illustrated in the accompanying two sheets of drawings, in which—

Figure 1 shows in side elevation a plant equipped for treating milk in the manner stated and embracing all the apparatus necessary for the purpose. Fig. 2 is an enlarged vertical cross-section on line 2 2 of Fig. 1. Fig. 3 is an enlarged vertical cross-section on line 3 3 of Fig. 1.

All the different parts of this plant containing and confining milk either consist of or are lined with suitable metal—like copper, block-tin, or zinc, for instance. The air used for the various purposes during the operation of this plant is moved by an air-pump 6, which it enters at 7 through a pipe 8, the open or receiving end of which is protected by a strainer, as shown at 9. Before entering the pump this air is cooled, for which purpose pipe 8 is of sufficient length to permit the same to be passed in several (more or less) convolutions or coils through a cooling medium, preferably a brine-tank 11. The milk to be treated is first introduced through a funnel 12 into a tank 13. After sufficiently charged the inlet-opening to the latter is closed and cooled air is admitted through a pipe 14, which enters the tank at the bottom. A spray-nozzle 15 is provided thereat, which causes the entering air to issue in jets which penetrate through all parts of the milk and cause the same to become thoroughly aerated and cooled. Fumes and animal heat driven off make their exit through an outlet-opening 16, which is now open for such purpose. After sufficiently cooled and aerated this outlet-opening is closed again, as is also valve 17, which admitted the air from below. Another valve 18 is then opened, admitting the air through a pipe 19, from which it issues at 21, and pressing on top of the milk forces the same out of the tank, the exit being effected through a pipe 22, in which it is raised to the first strainer 23. It is evident that the emptying of the tank might be accomplished in a different manner—as, for instance, by gravity—provided it were located upon an upper floor, and it is only done in the described manner on account of the position of the parts. This strainer consists, substantially, of a suitable wooden box, metal lined, and containing one or more frames 24, (see Fig. 2,) with a suitable straining medium, preferably silk cloth 25, stretched across them and through which cloth, if there are more frames, the milk successively passes. This construction permits ready access to the parts and removal whenever necessary for the purpose of cleaning or renewing the straining material. After thus strained the milk is preheated in the preliminary heater 26, which is substantially a box-shaped structure containing an inner closed tank 27 with a space 30, packed with a suitable non-conducting material around it. This inner tank contains the heating agent—hot water or steam—which is supplied by a pipe 28 and enters through branches 29. The milk coming from the strainer traverses this inner heated tank in one or more coils 31, entering at one end and leaving at the other, where they join in a manifold 32, and proceeds thence through one pipe 33, controlled by a valve 34, to the sterilizer 35. A thermometer 36 indicates the heat of the milk after leaving the heater 26. The sterilizer consists, substantially, of a box-shaped structure, within which, by suitable stays and braces, a cylindrical tank 37 is supported in a manner to leave a space all around and between it and the outer structure. This space forms a chamber 38 and contains the agent for heating the milk within the inner cylinder 37, which has entered the same through pipe 33. The heating of the sterilizer is preferably in the same manner as that for heater 26 and for which purpose pipe 28 is sufficiently extended, entrance to space 38 being effected by branches 39. In order to obtain the necessary circulation for the heating agent, (steam in this case,) outlets are provided from tank 27 and from space 38 of the sterilizer in the shape of a pipe 41, the ends of which connect to the parts mentioned. From this pipe the circulation continues through a pipe 42, a steam-trap 40 being interposed in the position shown. Whenever desirable, as at the end of operations, tank 27 and space 38 may be completely drained, for which purpose a pipe 43 is provided, the end of which also connects to the parts mentioned, but at their lowest levels. Pipes 42 and 43 are preferably joined, thereby permitting them to be continued as one outlet-pipe, as shown at 44. Valves are of course provided in this system of pipes wherever necessary and as is expedient in such cases to permit or cut off free passage to certain parts and to permit manipulation in any manner as may be required. While in the sterilizing-tank the milk is stirred by a suitable agitating device, preferably in shape of perforated wings 45, which are mounted upon a shaft 46, whereby they are operated. Rotation of this shaft may be obtained in any suitable manner—as, for instance, by an electric motor 47, as shown—transmission of power being had by pulleys and a belt 48. Any fumes arising while the sterilizing operation is proceeding are carried off by a pipe 49, through which they are drawn by pump 6 and passed through pipes 14 and 50 to the open air or to a sewer.
Valves 17 and 18 are at that time closed against tank 13 and a valve 51 is provided, which closes pipe 8 against the pump.

52 are thermometers, one connecting with tank 37, the other with the space surrounding it, and indicate, respectively, the heat of the milk and the heat within said space.

53 is a vacuum-gage, and 54 is a gage showing level of milk.

After sterilized the milk is strained once more by being passed through a strainer 55 by a pipe 56, which strainer is constructed exactly like the one (23) described before, except that the mesh of the silk cloth may be finer. After thus strained the milk may be drawn off into cans for immediate use, as shown at 57, passing out through a pipe 58, or it may be bottled, in which case it discharges through an outlet 59, the outlet at 57 being then closed. In this latter case a suitable bottling apparatus 61 should be provided, which the milk enters, and an oven 62, within which the bottles are sufficiently heated to become germ-proof. If to be cooled first before disposed of in either way, the milk is first passed through a coil 63, which traverses the cooling-tank 11. A valve 64 is used, whereby the flow of the milk may be shifted either way. The cooled milk may then also issue either at 57 or 59.

The cooling apparatus and cooling medium used for passing coil 63 through is substantially a tank containing brine, which latter surrounds coil 63 and is cooled by ammonia-gas in the well-known way. A sufficient number of coils 65 are provided, through which this gas passes for the purpose of cooling the brine which surrounds these coils. One end of all of these coils connects each to a manifold 66, which is charged through a pipe 67 with the compressed gas coming from a condenser. The other end of all of these coils connect each to a manifold 68, which receives the expanded gas, which returns through a pipe 69 to a compressor. This pipe 69 has no connection with manifold 66, as in Fig. 1 it apparently seems to have, but passes back of the latter. The walls of this tank may be constructed in any approved manner suitable for the purpose. They are double, with a space between to receive a filling of a suitable non-conducting material. It is necessary from time to time that the pipes composing the milk-coil 63 be cleaned out, which is best done by blowing steam through them. Before such is done, however, the brine surrounding this coil is removed to prevent the same from getting hot. In order to avoid the necessity to drain the whole tank, the latter is divided by partitions 71 into three compartments, the middle one of which contains the milk-coil and is consequently the only one to be emptied. For such purpose a pump 72 is provided, which through a pipe 73 draws the brine out from the middle compartment. It is supplied again through a pipe 74 to one of the outside compartments, from which through an overflow-opening near the top of the partitions it runs over to the middle compartment.

Communication between the outside compartments is had by a pipe 75 for the purpose of equalizing their levels. This pipe is controlled by a valve 76, operated from above by a hand-wheel 77. All or part of the brine temporarily withdrawn might also for the time being occupy the outer compartments, provided they are not completely filled at first, in which case it would be drawn out from the middle one through pipe 73 and immediately returned through the other pipe 74 to the outer compartments and equalized in them by a pipe 75. In place of the overflow above mentioned valve 76 would be a three-way cock, which could be manipulated in a way that communication is had with all three compartments for the purpose of refilling the middle one again. The air-pipe coil 8, provided for cooling the air, is also located within the middle compartment. Part 78 of the milk-coil at the turns which are outside of tank 11 is made of glass to show passage of milk, thereby rendering the condition of the plant as to operation visible.

79 is a thermometer which shows condition of milk as to temperature when leaving the cooling-tank. As will be seen, the milk is subjected to cold as well as heat for the purpose of sterilization, and from the time it enters tank 13 to the time when it leaves the plant it passes through a completely-closed circuit, whereby it is kept free from any contamination as well as from any contact with air. This circulation is through tank 13, pipe 22, strainer 23, pipe 31, through heater 26, pipes 32 and 33 to sterilizer 35, from it through strainer 55, and out at 57 or 59 either through pipe 58 or cooling-coils 63. The air used for the various purposes is moved by air-pump 6, cold air for sterilizing by cold and aerating, through pipes 8 and 14 to and through tank 13, for emptying the latter by air-pressure through pipes 8, 14, and 19, and for drawing off bad air from the sterilizer through pipes 49, 14, and 50. Steam for heating is supplied by pipe 28 and enters heater 26 through branches 29 and the sterilizer through branches 39. It passes out through pipe 41, steam-trap 40, and pipes 42 and 44. The water arising from condensed steam may be drained from heater 26 or from the sterilizer through pipes 43 and 44. The cold air required is obtained by passing pipe 8 through a brine-tank 11, in which the milk is also cooled by being passed through coil 63. The brine in the tank is cooled by ammonia-pipes 65.

Having described my invention, I claim as new—

1. In a plant for treating milk hygienically, by subjecting it to the action of cold air, heat and cooling, the combination of an aerator in which the milk is subjected to the action of cold air, a sterilizer in which it is heated and a cooling-tank in which the air for the aerator is cooled and the temperature of the sterilized milk reduced.

2. In a plant for treating milk hygienically, by subjecting it to the action of cold air, heat and cooling, the combination of an aerator in which the milk is subjected to the action of cold air, a sterilizer in which it is heated, a cooling-tank in which the temperature of the sterilized milk is reduced and a cold-air circuit to supply the air to the aerator, part of said circuit passing through the cooling-tank mentioned for the purpose of cooling the air.

3. In a plant for treating milk hygienically, by subjecting it to the action of cold air, heat and cooling, the combination of an aerator in which it is subjected to the action of cold air, a sterilizer in which the milk is heated, a cooling-tank in which the temperature of the milk is reduced, an air-circuit connecting with the aerator at the bottom and near the top of the same, also with the sterilizer and with the cooling-tank, means for putting the air under pressure, and for moving it to and between the devices mentioned, valves in said circuit whereby air may be admitted at the bottom of the aerator for purposes of aerating the milk, valves whereby air under pressure may be admitted on top of the milk while in the aerator to empty the latter, and valves whereby the circuit may be connected with the sterilizer to draw bad air from the latter.

4. In a plant for treating milk substantially as described and containing as parts, a cooling and aerating tank and a sterilizer, the air-conduit for supplying cold air to the cooling and aerating tank and for drawing bad air out of the sterilizer, consisting of coil 8 within which the air is cooled, a cooling-tank within which this coil is contained, a pipe 14 connecting with tank 13 a pipe 49 connecting with the sterilizer, and a pump for moving either cooled air to tank 13, or for drawing bad air out of the sterilizer.

5. A cooling-tank 11 forming part of a plant for treating milk substantially as described, being subdivided by vertical partitions into compartments to contain brine, ammonia-pipe coils for cooling this brine, a pipe-coil 63 within one of the compartments to pass the milk through, a pipe-coil 8 for cooling air, and means for withdrawing the brine independently from the compartment containing the milk-coil and for supplying it again thereto.

In testimony whereof I hereunto affix my signature in presence of two witnesses.

WILLIAM F. NIEBLING.

Witnesses:
C. SPENGEL,
ARTHUR KLINE.